United States Patent [19]

Sharp

[11] 4,226,137
[45] Oct. 7, 1980

[54] SCREW AND NUT MECHANISM

[75] Inventor: Roy T. Sharp, Cheddington, England

[73] Assignee: Lucas Industries Limited, Birmingham, England

[21] Appl. No.: 926,242

[22] Filed: Jul. 20, 1978

[30] Foreign Application Priority Data

Aug. 4, 1977 [GB] United Kingdom ............... 32719/77

[51] Int. Cl.² ............................................. F16N 55/04
[52] U.S. Cl. ...................................................... 74/459
[58] Field of Search ............................................ 74/459

[56] References Cited

U.S. PATENT DOCUMENTS

| 2,833,156 | 5/1958 | Spontelli | 74/459 |
| 2,833,157 | 5/1957 | Gates | 74/459 |
| 3,902,377 | 9/1975 | Lemor | 74/459 |

Primary Examiner—Werner H. Schroeder
Assistant Examiner—Doris L. Troutman

Attorney, Agent, or Firm—Holman & Stern

[57] ABSTRACT

A recirculating ball screw and nut mechanism wherein the screw of the mechanism comprises a shaft having an external helical groove, and the nut comprises a sleeve encircling the shaft and having an internal helical groove defining with the groove a helical working track in which run balls effective co-operation between the nut and the screw. The balls move from one end to the other of the working track during relative rotation of the nut and screw and are returned from said other end to said one end of the working track by way of a ball return path. The return path includes a groove extending around the inner wall of the sleeve and/or the outer surface of the shaft coaxial with the working track and between the convolutions of the working track without crossing the working track. The return path includes generally U-shaped regions at each for respectively diverting balls from and returning balls to the working track.

4 Claims, 4 Drawing Figures

SCREW AND NUT MECHANISM

This invention relates to a recirculating ball screw and nut mechanism of the kind wherein the screw of the mechanism comprises a shaft having an external helical groove and the nut of the mechanism comprises a sleeve encircling said shaft and having an internal helical groove defining with the groove of the shaft a helical working track in which run balls effecting co-operation between the nut and the screw, said balls moving from one end to the other of said working track during relative rotation of the nut and screw and being returned from said other to said one end of the working track by way of a ball return path.

In a mechanism of the kind specified it is known for the return path to be defined by an insert having a groove or passage which extends axially of the nut and which retrieves balls from a point at the end of one convolution of the working track and returns them to the start of the convolution. In order that the return path does not interfere with the working track the return is restricted to one convolution, that is to say the balls operate over a single convolution of the working track. In practice, the working track of such an arrangement is reduced to less than a complete convolution since there must be a curved "lead-in" and "run-out" at the ends of the return path where the return path merges with the working track. Such an arrangement is acceptable for mechanisms having a helical working track of shallow pitch angle, but where the track is reduced to about one half of one convolution by the curved "lead-in" and "run-out" regions of the otherwise axial return path. Such a short working track does not provide adequate support between the nut and the screw, and even if, as has been proposed, two or more separate tracks and return paths are used then the two or more are axially spaced and so the support although increased is still not adequate for many applications. It has been proposed to overcome such problems by returning the balls to an earlier convolution, jumping one or more intervening convolutions, so that the length of the working track is increased. This solution to the problem necessitates a return path whereby balls in the axially extending return path cross over the working track without interfering with balls in the helical working track; and this itself poses problems in that the overall diameter of the nut must be large in comparison with the single convolution return arrangement. The wall thickness of the nut must be sufficient to accommodate a return passage which can pass over the working track without intersecting the working track, thus involving a considerable quantity of material in that nut. Alternatively the effective external diameter of the nut is increased by way of an external tube or tubes along which the balls run, the tube or tubes defining part of the return path. It is an object of the present invention to provide a recirculating ball screw and nut mechanism, having a working track in excess of one convolution and wherein the above mentioned problem nut dimension is minimised.

According to the present invention in a mechanism of the kind specified the return path includes a groove extending around the inner wall of the sleeve and/or outer surface of the shaft, coaxial with the working track and between convolutions of the working track without crossing the working track, the return path including generally U-shaped regions at each end for respectively diverting balls from and returning balls to the working track.

In one aspect of the present invention said groove extends helically parallel to the working track.

Desirably the helical groove is defined in the inner wall of the sleeve, the groove having depth greater than the ball diameter.

In a second aspect of the invention, said groove is formed solely in the nut and does not extend parallel to the working track, the length of the groove thus being determined inter-alia by the angle subtended between the groove and the working track.

Conveniently the angle is subtended between the groove and the working track, and the length of the groove are such as to cause the position of the inlet end of the groove to be adjacent the working track convolution into which balls are returned and the return end of the groove to be adjacent the convolution of working track from which balls are diverted so as to afford U-shaped return path end regions of maximum radius of curvature.

One example of the invention is illustrated in the accompanying drawings, wherein.

Figure 1:
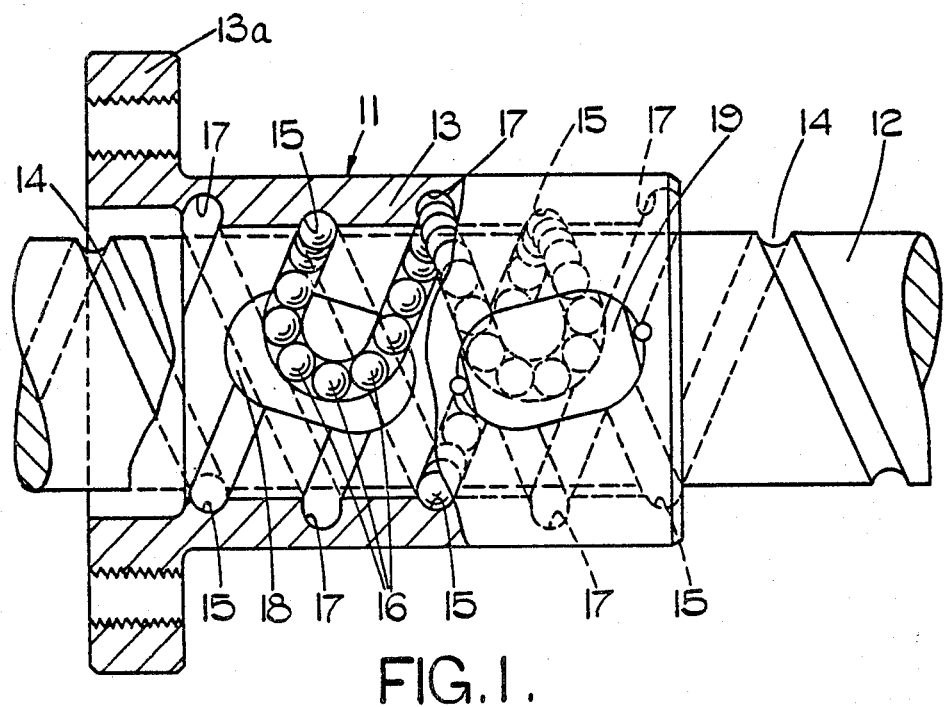
FIG. 1 is a diagrammatic part sectional representation of a recirculating ball screw and nut mechanism.
Figure 2:
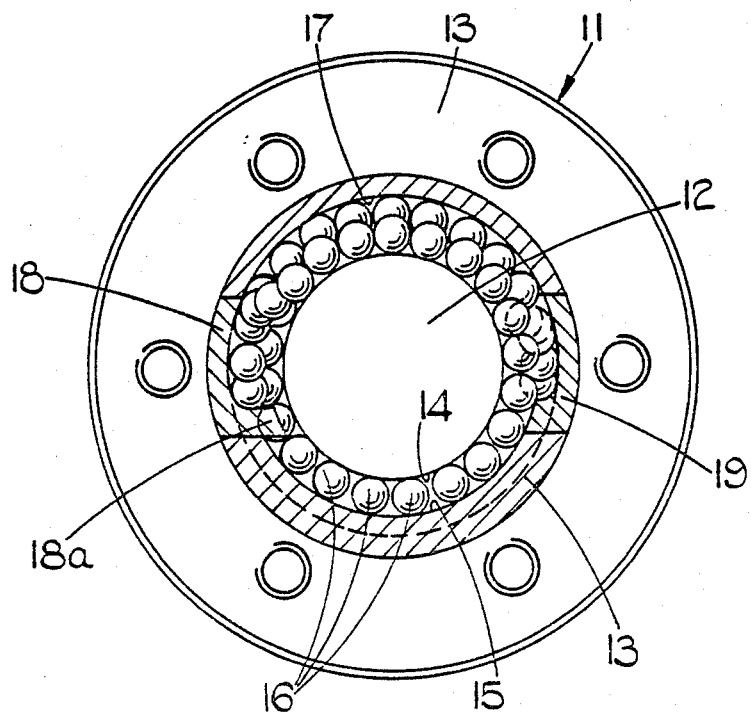
FIG. 2 is a composite transverse sectional view of the arrangement shown in FIG. 1 illustrating both the inlet and outlet of balls relative to the working track.
Figure 3:
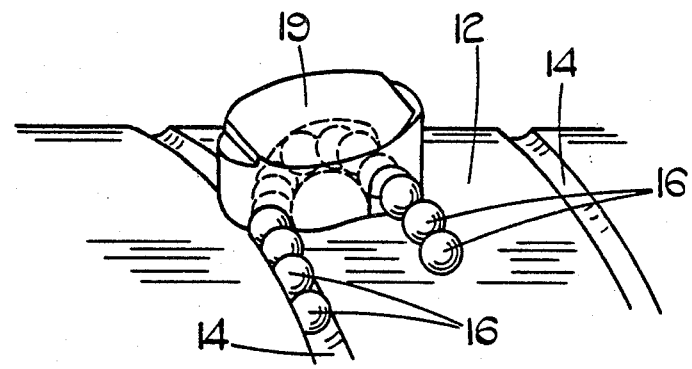
FIG. 3 is a diagrammatic perspective representation of part of the mechanism shown in FIGS. 1 and 2.

Referring first to FIGS. 1 to 3 of the drawings the recirculating ball screw and nut mechanism comprises a nut 11 and a screw 12. The nut 11 is defined by a cylindrical metal sleeve 13 of circular transverse cross-section having at one axial end thereof an integral, radially outwardly extending peripheral flange 13a. The screw 12 is in the form of a solid metal shaft having a helically extending groove 14 cut in its outer surface. The groove 14 is of semi-circular transverse cross-section. A second helically extending groove 15 also of semi-circular transverse cross-section is formed in the inner wall of the sleeve 13. The radius of the semi-circular groove 14 is equal to that of the groove 15, and the grooves 14, 15 have the same helical pitch angle. Thus when the sleeve 13 encircles the shaft 12 and the grooves 14, 15 are aligned then the grooves 14, 15 define a helical passage of substantially circular transverse cross-section.

One and one-half turns or convolutions of the helical passage defined by the grooves 14, 15 contain steel balls 16 and constitute the working track of the mechanism. The balls 16 are a close running fit in the grooves 14, 15 and it will be understood that the balls 16 effect co-operation between the nut 11 and the screw 12 so that relative rotation of the nut 11 and screw 12 will be accompanied by relative axial movement. As with any ball screw mechanism the relative rotation of the nut and the screw involves progression of the balls along the working track and thus a return path must be provided for returning the balls from the finish of the working track back to the start of the working track.

In order to provide a return path the sleeve 11 is formed with a second helically extending groove 17. The base of the groove 17 is of semi-circular cross-section and is of a radius slightly greater than the radius of the balls 16 to achieve a close running fit therewith. However the depth of the groove 17 is slightly greater than the diameter of the balls so that the balls can be received wholly within the groove 17. The pitch angle of the helical groove 17 is equal to the pitch angle of the helical groove 15 and the helical groove 17 extends in the same direction as the helical groove 15, but is axially spaced therefrom so that the convolutions of the groove 17 lie in parallel to and equi-distantly from the convolutions of the groove 15. The grooves 15, 17 thus constitute a pair of coaxial helixes of equal pitch angle and spaced axially from one another by one half of their axial groove to groove dimension.

It will be recognised that the grooves 15, 17 do not cross one another and thus the return path defined in part by the groove 17 does not interfere with the working track constituted by the grooves 14, 15. In order to receive the balls 16 from the end of the working track, and to feed them into the return path defined by the groove 17, there is provided a first liner 18. Similarly in order to return balls from the return path into the working track there is provided a second, similar liner 19. The liners 18, 19 are formed from metal or plastics blocks and are inserted into oval apertures in the sleeve 13. Each of the liners includes a groove having a semi-circular base each groove following a U-shaped path. The positioning of each of the liners 18 is such that one end of the groove in each liner is aligned with the working track and the other end of the groove in each liner is aligned with the groove 17 defining the return path. The liner 18 differ from the liner 19 in that it includes a portion 18a extending radially inwardly of the sleeve to constitute an abutment in the groove 15 of the sleeve. The abutment serves to deflect balls approaching the liner along the working track so that they enter the groove of the liner and follow the groove through 180° (a U-turn) and lead the balls into the groove 17. It will be appreciated that in the absence of the projection 18a, the balls 16 would not enter the liner but would continue along the grooves 15, 14 in effect extending the working track until the balls came to the end of the sleeve 13 whereupon they would merely fall from the groove 14. As mentioned above balls progressing along the working track engage the projection 18a and are deflected by the projection 18a into the groove of the liner 18. The groove in the liner increases in depth from the point adjacent the projection 18a wherein the depth is equal to the depth of the groove 15 to the opposite end of the groove in the liner where its depth is equal to that of the groove 17. Thus at one end the groove in the liner merges with the groove 15 of the sleeve and at its other end, after a 180° turn, the groove in the liner 18 merges with the groove 17. Balls 16 thus enter the return path by way of the liner 18 and then move along the liner 19 wherein they are again turned through 180° by the U-shaped groove of the liner 19 and pass from the liner 19, back into the working track defined by the grooves 14, 15. It will be appreciated therefore that the balls, as with conventional ball screw mechanism, move in a closed loop constituted by the working track and the return path, the working track and the return path being completely filled with balls 16.

As mentioned above in the example shown in the drawings, the working track is one and one-half convolutions of the helical grooves 14, 15. The part of the return path defined by the groove 17 is thus one-half of one convolution of the helical groove 17 and the liners 18, 19 are thus both spaced apart axially of the sleeve 13 and spaced apart circumferentially of the sleeve. It is to be understood however, that if desired the working track could be more than one and one-half convolutions or indeed could be less than one and one-half convolutions. It will be appreciated that provided the sleeve is of sufficient axial length then the working track can be as long as is desired within the known theoretical limits of a ball screw mechanism, and the return path will be of an appropriate length, and owing to the fact that the groove 17 is a helix parallel to the working track, the working track and return path do not intersect or cross at any point.

It will be recognised that for simplicity of machining the grooves 15 and 17 in the sleeve 13 extend along the full length of the sleeve, although the full lengths of the grooves are not used either in the return path or the working track. As with conventional ball screw mechanisms the nut can be fixed both axially and angularly and the shaft can be rotated to cause axial movement of the shaft. Alternatively the shaft can be angularly fixed and the nut can be rotated to effect axial movement of the shaft. As a further alternative of course, the nut can be moved axially by rotation of the shaft or by rotation of the nut relative to the shaft.

In the example described above, and illustrated in the drawings, the return path is provided by a groove 17 in the nut defined by the sleeve 13. It is to be understood however that the return path could be defined by a pair of grooves one in the sleeve and one in the shaft 12, the groove in the shaft 12 being parallel to the groove 14. In such an arrangement it would be necessary to provide adequate clearance to permit the balls to move along the return path, and of course the liners 18, 19 would need to be arranged to transfer balls over the land separating the working track and the return path.

As a further modification it will be understood that the groove defining the return path could be solely in the shaft 12 parallel to the groove 14. In such an arrangement the liners 18, 19 would be modified accordingly to lift the balls over the land between the grooves and to direct the balls into and out of the deeper groove in the shaft 12, constituting the return path.

Figure 4:
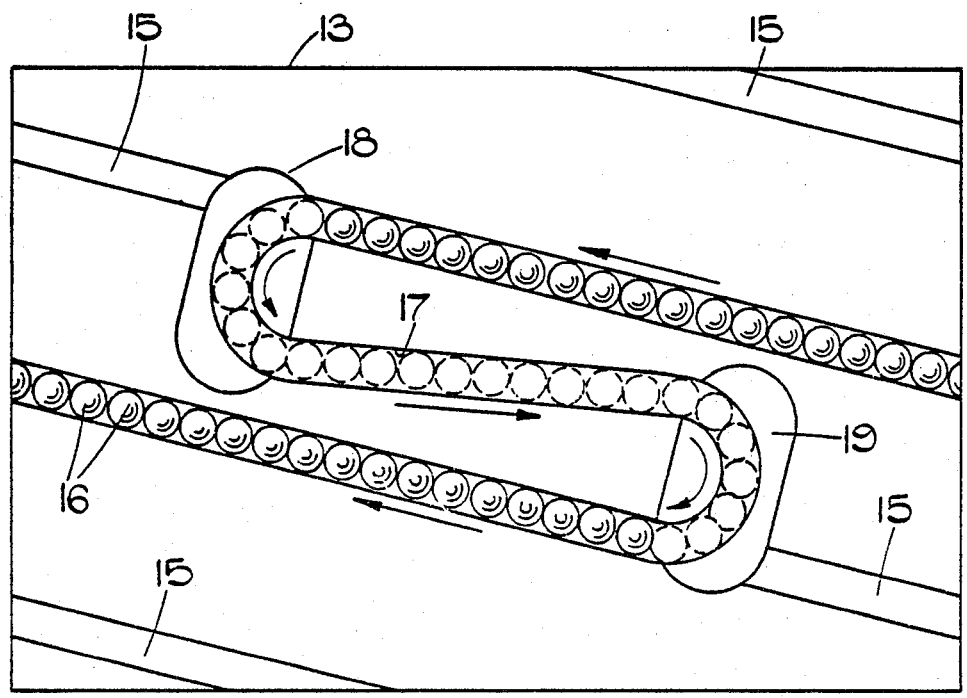
FIG. 4 is a developed representation of a modification of mechanism shown in FIGS. 1 to 3.

In the example described above the return path is parallel to the working track and in consequence, the working track can be as long as is required without intersection of the working track and return path. However, it is to be understood that the return path need not be parallel to the working track. The angle subtended between the working track and the return path will of course determine the maximum length of the working track since this angle determines the points at which the working track and return path would cross. FIG. 4, shows an arrangement wherein the groove 15 forming part of the working track and the groove 17 defining part of the return path, are inclined at an angle which affords the optimum space at the ends of the return path groove to accommodate the liners 18, 19 with a working track length of approximately one and one-half convolutions. The optimising of the space for the liners permits the use of liners having the largest possible radius of curvature and this is advantageous in that the larger the radius of curvature of the 180° turn which the balls make then the smoother and more efficient is the mechanism. It will be understood that where the working track and return path are not parallel then the return path groove will be solely in the nut or sleeve of the mechanism. In a mechanism having a maximum operating stroke of length less than the maximum axial length of working track for a given inclination of return path to working track it would be possible to provide the return path groove in the sleeve and/or the shaft but such an arrangement is unlikely to occur in practice.

I claim:

1. A recirculating ball screw and nut mechanism comprising a screw which includes a shaft having an external helical groove, a nut including a sleeve encircling said shaft, said sleeve having an internal helical groove defining with said external groove of the shaft a helical working track and balls running in said track for effecting co-operation between the nut and the screw, said balls moving from one end to the other end of said working track during relative rotation of the nut and screw and means wholly within said sleeve defining a ball return path for returning balls from said other end to said one end of the working track, said ball return path including a groove extending around an inner wall of the sleeve coaxial with the working track and between convolutions of the working track without crossing the working track, said groove having a depth greater than the diameter of the balls and the return path including a generally U-shaped region at each end for respectively diverting balls from and returning balls to the working track.

2. A mechanism as claimed in claim 1 wherein said groove extends helically parallel to the working track.

3. A mechanism as claimed in claim 1 wherein said groove extends in a direction other than parallel to the working track.

4. A mechanism as claimed in claim 3 wherein the angle subtended between the groove and the working track, and the length of the groove are such as to cause the position of the inlet end of the groove to be adjacent the working track convolution into which balls are returned and the return end of the groove to be adjacent the convolution of working track from which balls are diverted, so as to afford U-shaped return path end regions of maximum radius of curvature.

* * * * *